(12) United States Patent
Cocos

(10) Patent No.: US 7,779,330 B1
(45) Date of Patent: Aug. 17, 2010

(54) METHOD AND APPARATUS FOR COMPUTING CHECKSUM OF PACKETS

(75) Inventor: Costin Cocos, Malsch (DE)

(73) Assignee: Marvell International Ltd., Hamilton (BM)

( * ) Notice: Subject to any disclaimer, the term of this patent is extended or adjusted under 35 U.S.C. 154(b) by 1125 days.

(21) Appl. No.: 11/415,554

(22) Filed: May 2, 2006

Related U.S. Application Data

(60) Provisional application No. 60/737,035, filed on Nov. 15, 2005.

(51) Int. Cl.
*H03M 13/00* (2006.01)
(52) U.S. Cl. .................... 714/758; 714/776
(58) Field of Classification Search ............. 714/758, 714/776
See application file for complete search history.

(56) References Cited

U.S. PATENT DOCUMENTS

| | | | | |
|---|---|---|---|---|
| 5,630,054 A | * | 5/1997 | Trang | 714/52 |
| 5,663,952 A | * | 9/1997 | Gentry, Jr. | 370/252 |
| 6,192,492 B1 | * | 2/2001 | Masiewicz et al. | 714/56 |
| 6,907,466 B2 | * | 6/2005 | Alexander et al. | 709/232 |
| 6,920,142 B1 | * | 7/2005 | Hodgins et al. | 370/397 |
| 7,042,898 B2 | * | 5/2006 | Blightman et al. | 370/463 |
| 7,243,289 B1 | * | 7/2007 | Madhusudhana et al. | 714/758 |
| 7,283,528 B1 | * | 10/2007 | Lim et al. | 370/392 |
| 2004/0062267 A1 | * | 4/2004 | Minami et al. | 370/463 |
| 2004/0133676 A1 | * | 7/2004 | Stachura et al. | 709/224 |
| 2005/0097429 A1 | * | 5/2005 | Propp et al. | 714/780 |
| 2005/0149823 A1 | * | 7/2005 | Lee | 714/758 |
| 2006/0195759 A1 | * | 8/2006 | Bower | 714/758 |
| 2007/0022225 A1 | * | 1/2007 | Nair et al. | 710/22 |

\* cited by examiner

*Primary Examiner*—M. Mujtaba K Chaudry

(57) ABSTRACT

A network interface includes a control module and a transmit module. The control module reads a segment of a packet and stores the segment in memory of the network interface when a size of the packet is greater than a size of the memory. The control module generates a partial checksum for the packet based on the segment. The control module reads a remainder of the packet at a first time and updates the partial checksum based on the remainder to generate a final checksum for the packet. The control module reads the remainder at a second time, where the second time is subsequent to the first time. The transmit module transmits the segment from the memory and transmits the remainder read at the second time.

24 Claims, 8 Drawing Sheets

METHOD AND APPARATUS FOR COMPUTING CHECKSUM OF PACKETS

CROSS-REFERENCE TO RELATED APPLICATIONS

This application claims the benefit of U.S. Provisional Application No. 60/737,035, filed on Nov. 15, 2005. The disclosure of the above application is incorporated herein by reference in its entirety.

FIELD OF THE INVENTION

The present invention relates to communication systems, and more particularly to systems and methods for computing checksums for data packets.

BACKGROUND OF THE INVENTION

Communication systems use a variety of protocols for data transfers. For example, Internet-based communication systems use protocols such as transport control protocol (TCP), user datagram protocol (UDP), etc., for data transfer. When data is transmitted in packets, data integrity is ensured by employing various error-detecting schemes such as checksums.

In some communication systems, checksums are calculated by network adapters rather than by host devices before packets are transmitted. In some communication systems, however, network adapters may not have sufficient memory to calculate checksums. In that case, host devices calculate checksums, write checksums in packets, and forward the packets with checksums to network adapters for transmission.

Referring now to FIG. 1, a host device 10 stores a packet 12 of data to be transmitted in host memory 14. A network device 16 communicates with the host device 10 via a bus 18. The network device 16 has a network device memory 20.

The network device 16 reads the packet 12 from the host device 10, stores the packet 12 in the network device memory 20, generates a checksum for the packet 12, and transmits the packet 12 with the checksum. A receiving system that receives the packet 12 checks the data in the packet 12 against the checksum and determines whether the data in the packet 12 received is the same as the data in the packet 12 when the packet 12 was transmitted.

Space and cost considerations generally limit the size of the network device memory 20. When a packet size of the packet 12 is greater than a memory size of the network device memory 20, the network device 16 cannot store the packet 12 in the network device memory 20. Consequently, the network device 16 cannot calculate the checksum for the packet 12.

In that case, the host device 10 calculates the checksum for the packet 12 and writes the checksum in the packet 12 while the packet 12 is stored in the host memory 14. The host device 10 forwards the packet 12 with the checksum to the network device 16. The network device 16 transmits the packet 12 with the checksum.

SUMMARY OF THE INVENTION

A network interface for transmitting packets comprises a control module of the network interface that stores a segment of at least one of the packets in memory of the network interface, wherein a memory size of the memory is less than a packet size of at least one of the packets. The control module receives a remainder of at least one of the packets, generates a checksum for at least one of the packets, and selectively writes the checksum in the segment. The network interface comprises a transmit module of the network interface that transmits the segment from the memory and that transmits the remainder when the remainder is received again. The memory size is at least equal to a segment size of the segment.

In another feature, an integrated circuit comprises the network interface.

In another feature, the control module writes the checksum in the segment when the segment comprises a checksum field for at least one of the packets. The control module writes the checksum in the remainder when the remainder is received again and when the remainder comprises a checksum field for at least one of the packets.

In another feature, the transmit module transmits the segment with the checksum when the segment comprises a checksum field for at least one of the packets. The transmit module transmits the remainder with the checksum when the remainder comprises a checksum field for at least one of the packets.

In another feature, the control module generates a partial checksum when the segment is received and generates the checksum by updating the partial checksum when the remainder is received. The control module writes the partial checksum in the segment when the segment comprises a checksum field for at least one of the packets.

In another feature, a network device comprises the network interface.

In another feature, the network interface transmits the packets over one of Ethernet, optical, and wireless medium.

In still other features, a network interface for transmitting packets comprises a control module of the network interface that receives at least one of the packets, wherein a packet size of at least one of the packets is greater than a memory size of memory of the network interface. The control module generates a checksum for at least one of the packets, and that writes the checksum in at least one of the packets when at least one of the packets is received again. The network interface comprises a transmit module of the network interface that transmits at least one of the packets with the checksum.

In another feature, a network device comprises the network interface.

In another feature, the network interface transmits the packets over one of Ethernet, optical, and wireless medium.

In another feature, an integrated circuit comprises the network interface.

In still other features, a method for transmitting packets comprises storing a segment of at least one of the packets in memory, wherein a memory size of the memory is less than a packet size of at least one of the packets. The method further comprises receiving a remainder of at least one of the packets, generating a checksum for at least one of the packets, selectively writing the checksum in the segment, transmitting the segment from the memory, and transmitting the remainder when the remainder is received again. The memory size is at least equal to a segment size of the segment.

In another feature, the method further comprises writing the checksum in the segment when the segment comprises a checksum field for at least one of the packets. The method further comprises writing the checksum in the remainder when the remainder is received again and when the remainder comprises a checksum field for at least one of the packets.

In another feature, the method further comprises transmitting the segment with the checksum when the segment comprises a checksum field for at least one of the packets. The method further comprises transmitting the remainder with the checksum when the remainder comprises a checksum field for at least one of the packets.

In another feature, the method further comprises generating a partial checksum when the segment is received and generating the checksum by updating the partial checksum when the remainder is received. The method further comprises writing the partial checksum in the segment when the segment comprises a checksum field for at least one of the packets.

In another feature, the method further comprises transmitting the packets over one of Ethernet, optical, and wireless medium.

In still other features, a method for transmitting packets comprises receiving at least one of the packets in memory, wherein a packet size of at least one of the packets is greater than a memory size of the memory. The method further comprises generating a checksum for at least one of the packets, writing the checksum in at least one of the packets when at least one of the packets is received again, and transmitting at least one of the packets with the checksum.

In another feature, the method further comprises transmitting the packets over one of Ethernet, optical, and wireless medium.

In still other features, a network interface for transmitting packets comprises control means of the network interface for storing a segment of at least one of the packets in memory of the network interface, wherein a memory size of the memory is less than a packet size of at least one of the packets, receiving a remainder of at least one of the packets, generating a checksum for at least one of the packets, and selectively writing the checksum in the segment. The network interface comprises transmit means of the network interface for transmitting the segment from the memory and transmitting the remainder when the remainder is received again. The memory size is at least equal to a segment size of the segment.

In another feature, an integrated circuit comprises the network interface.

In another feature, the control means writes the checksum in the segment when the segment comprises a checksum field for at least one of the packets. The control means writes the checksum in the remainder when the remainder is received again and when the remainder comprises a checksum field for at least one of the packets.

In another feature, the transmit means transmits the segment with the checksum when the segment comprises a checksum field for at least one of the packets. The transmit means transmits the remainder with the checksum when the remainder comprises a checksum field for at least one of the packets.

In another feature, the control means generates a partial checksum when the segment is received and generates the checksum by updating the partial checksum when the remainder is received. The control means writes the partial checksum in the segment when the segment comprises a checksum field for at least one of the packets.

In another feature, a network device comprises the network interface.

In another feature, the network interface transmits the packets over one of Ethernet, optical, and wireless medium.

In still other features, a network interface for transmitting packets comprises control means of the network interface for receiving at least one of the packets, wherein a packet size of at least one of the packets is greater than a memory size of memory of the network interface, generating a checksum for at least one of the packets, and writing the checksum in at least one of the packets when at least one of the packets is received again. The network interface comprises transmit means of the network interface for transmitting at least one of the packets with the checksum.

In another feature, a network device comprises the network interface.

In another feature, the network interface transmits the packets over one of Ethernet, optical, and wireless medium.

In another feature, an integrated circuit comprises the network interface.

In still other features, a computer program executed by a processor for transmitting packets comprises storing a segment of at least one of the packets in memory, wherein a memory size of the memory is less than a packet size of at least one of the packets. The computer program further comprises receiving a remainder of at least one of the packets, generating a checksum for at least one of the packets, selectively writing the checksum in the segment, transmitting the segment from the memory, and transmitting the remainder when the remainder is received again. The memory size is at least equal to a segment size of the segment.

In another feature, the computer program further comprises writing the checksum in the segment when the segment comprises a checksum field for at least one of the packets. The computer program further comprises writing the checksum in the remainder when the remainder is received again and when the remainder comprises a checksum field for at least one of the packets.

In another feature, the computer program further comprises transmitting the segment with the checksum when the segment comprises a checksum field for at least one of the packets. The computer program further comprises transmitting the remainder with the checksum when the remainder comprises a checksum field for at least one of the packets.

In another feature, the computer program further comprises generating a partial checksum when the segment is received and generating the checksum by updating the partial checksum when the remainder is received. The computer program further comprises writing the partial checksum in the segment when the segment comprises a checksum field for at least one of the packets.

In another feature, the computer program further comprises transmitting the packets over one of Ethernet, optical, and wireless medium.

In still other features, a computer program executed by a processor for transmitting packets comprises receiving at least one of the packets in memory, wherein a packet size of at least one of the packets is greater than a memory size of the memory. The computer program further comprises generating a checksum for at least one of the packets, writing the checksum in at least one of the packets when at least one of the packets is received again, and transmitting at least one of the packets with the checksum.

In another feature, the computer program further comprises transmitting the packets over one of Ethernet, optical, and wireless medium.

In still other features, the systems and methods described above are implemented by a computer program executed by one or more processors. The computer program can reside on a computer readable medium such as but not limited to memory, non-volatile data storage and/or other suitable tangible storage mediums.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
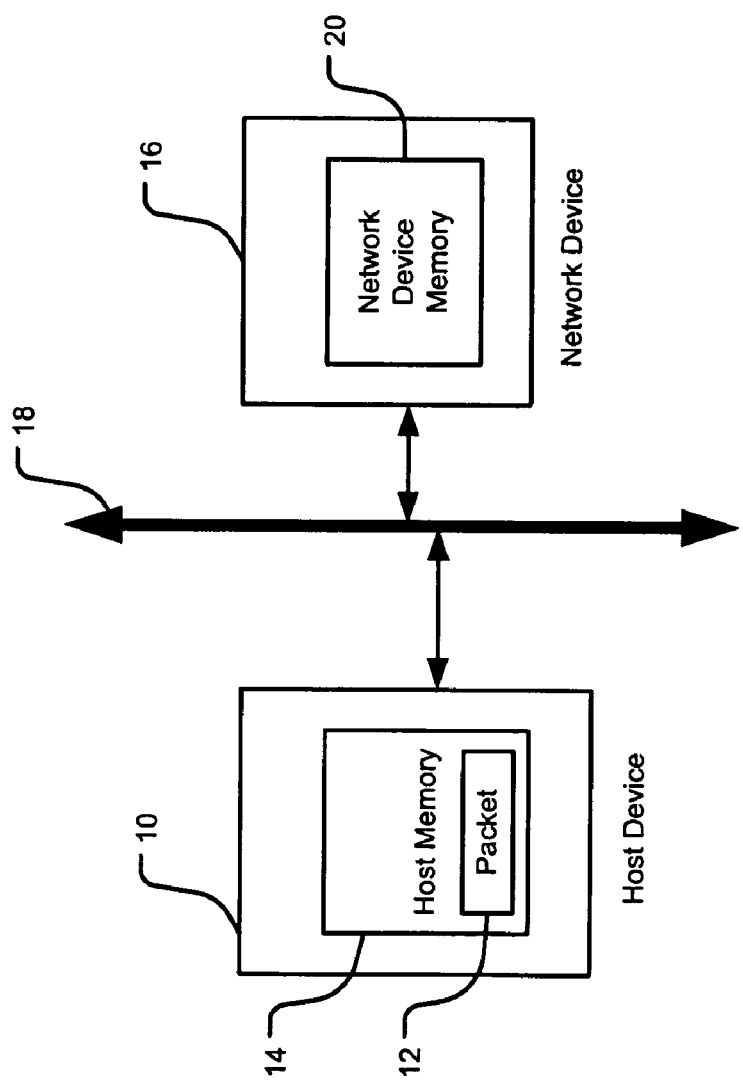
FIG. 1 is a functional block diagram of an exemplary communication system according to the prior art.

The following description of the preferred embodiment(s) is merely exemplary in nature and is in no way intended to limit the invention, its application, or uses. For purposes of clarity, the same reference numbers will be used in the drawings to identify similar elements. As used herein, the term module, circuit and/or device refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present invention.

When a packet size of data to be transmitted is greater than a memory size of memory of a network device, the network device can calculate a checksum for a packet, write the checksum in the packet, and transmit the packet with the checksum in two ways. In one way, the network device reads an entire packet from a host device for a first time, calculates the checksum for the packet, and stores the checksum in a register in the network device. No portion of the packet is stored in the memory of the network device. Thereafter, the network device reads the entire packet from the host device for a second time and writes the checksum into the packet while the packet is being read and transmitted by the network device.

In another way, the network device reads a portion or segment of the packet that can fit in the memory of the network device from the host device and stores the segment in the memory of the network device. The network device calculates a partial checksum based on data in the segment while the segment is read into the memory of the network device. The network device writes the partial checksum in the segment if the segment comprises a checksum field for the packet. The network device writes the partial checksum in a register in the network device if the segment does not comprises the checksum field. Thereafter, the network device reads the remainder of the packet from the host device and updates the partial checksum based on data in the remainder of the packet while the network device reads the remainder of the packet.

Subsequently, the network device transmits the segment from the memory of the network device. The network device transmits the segment with the checksum if the checksum is written in the segment. Otherwise the network device transmits the segment without the checksum. Thereafter, the network device reads only the remainder of the packet from the host device for a second time. If the checksum is not written in the segment, the network device writes the checksum from the register into the checksum field in the remainder of the packet while the network device reads the remainder. The network device simultaneously transmits the remainder with the checksum.

Figure 2:
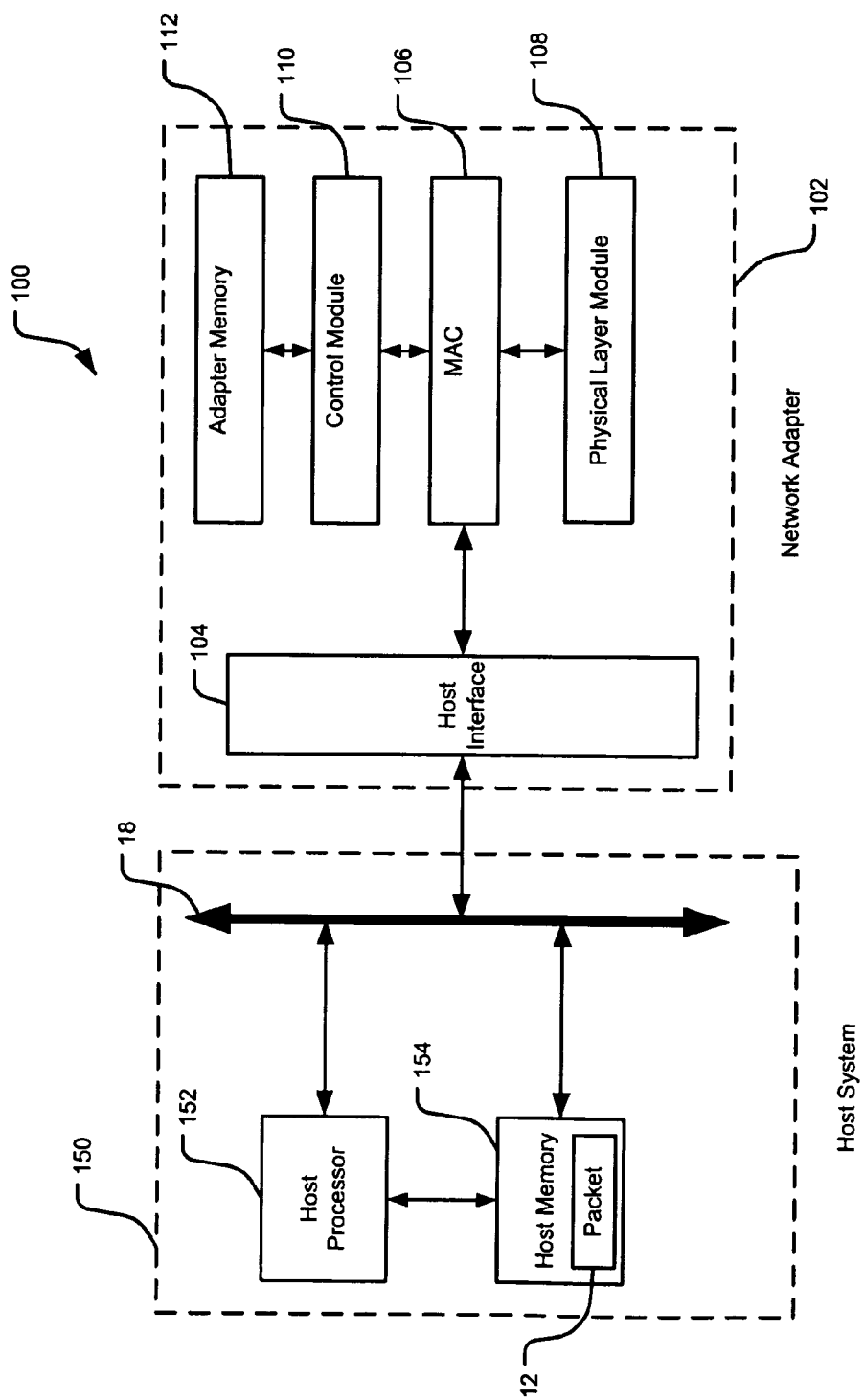
FIG. 2 is a functional block diagram of an exemplary system for generating checksums of packets according to the present invention.

Referring now to FIG. 2, a system 100 for computing checksums of packets is shown. A network adapter 102 communicates with a host system 150 via a bus 18. The network adapter 102 comprises a host interface 104, a medium access controller (MAC) 106, a physical layer module 108, a control module 110, and an adapter memory 112.

The host interface 104 communicates with the bus 18. The host interface 104 may comprise an interface such as peripheral component interconnect (PCI), small computer system interface (SCSI), etc. The medium access controller (MAC) 110 communicates with the host interface 104. The physical layer module 108 communicates with the MAC 110 and with a communication medium such as Ethernet, wireless, etc. The physical layer module 108 transmits packets 12 of data generated by the host system 150. The control module 110 controls the operation of the network adapter 102. The host system 150 comprises a host processor 152 that stores a packet 12 in the host memory 154.

Figure 3C:
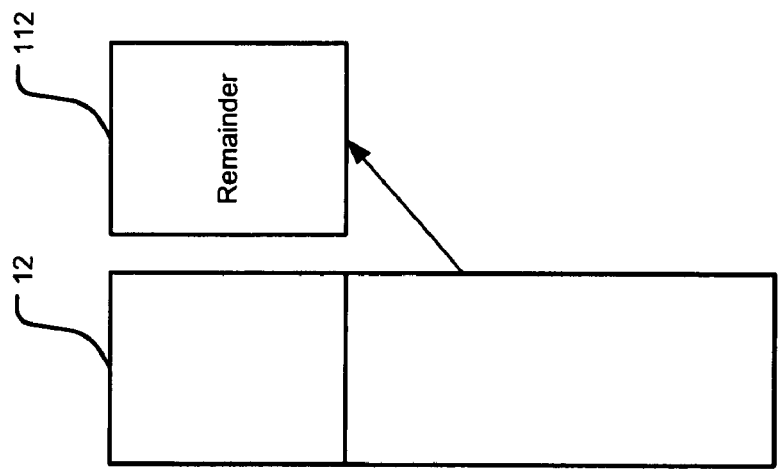
FIGS. 3A-3C show an exemplary method for generating checksums according to the present invention.
Figure 3B:
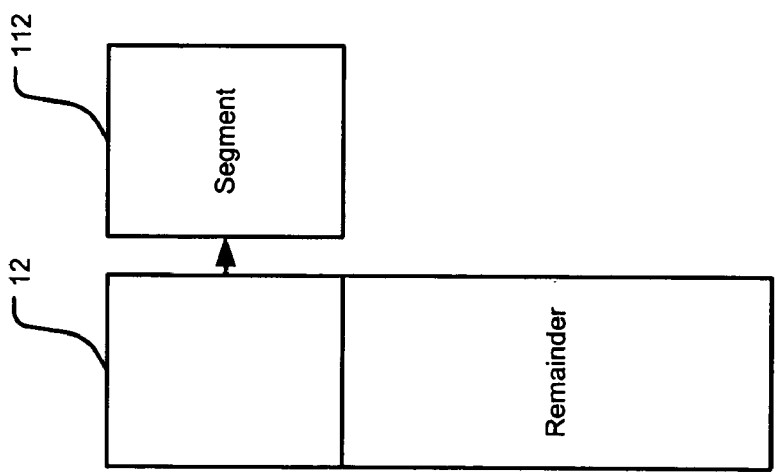
Figure 3A:
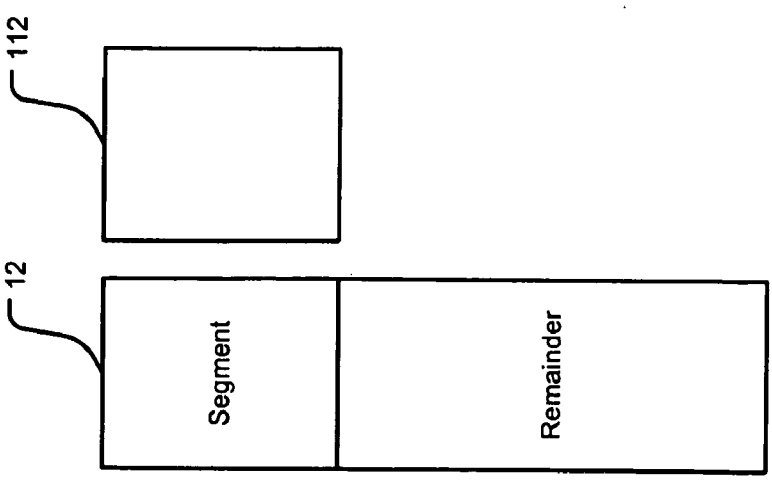

Referring now to FIGS. 3A-3C, the network adapter 102 typically generates a checksum for the packet 12 by reading all data of the packet 12 into the adapter memory 112. The checksum is generally stored in a beginning part or segment of the packet 12. A packet size of the packet 12, however, may be greater than a memory size of the adapter memory 112 as shown in FIG. 3A. In that case, the entire packet 12 cannot be stored in the adapter memory 112.

To calculate the checksum, the control module 110 reads the packet 12 in its entirety from the host memory 154 for a first time to calculate the checksum of the packet 12. The control module 110 calculates the checksum while reading the packet 12 and stores the checksum in a register in the control module 110. No part of the packet 12 is saved in the adapter memory 112. For example, if a segment of the packet 12 is read into the adapter memory 112 (FIG. 3B), a remainder of the packet 12 may write over the segment (FIG. 3C).

Thereafter, the control module 110 reads the entire packet 12 for a second time from the host memory 154 to transmit the packet 12. While reading the packet 12, the control module 110 writes the checksum from the register into a checksum field of the packet 12. The physical layer module 108 transmits the packet while the control module 110 reads the packet 12.

Reading the entire packet 12 once to generate the checksum and reading the entire packet 12 again to transmit the packet 12 with the checksum loads the bus 18. Loading on the bus 18 can be reduced by storing a part or segment of the packet 12 in the adapter memory 112 when the packet 12 is read for the first time. After the checksum for the packet 12 is calculated, the part of the packet 12 that is stored in the adapter memory 112 is transmitted directly from the adapter memory 112 and is not read for the second time from the host memory 154. Instead, only the remainder of the packet 12 is read for the second time from the host memory 154 when the packet 12 is transmitted with the checksum.

Figure 4C:
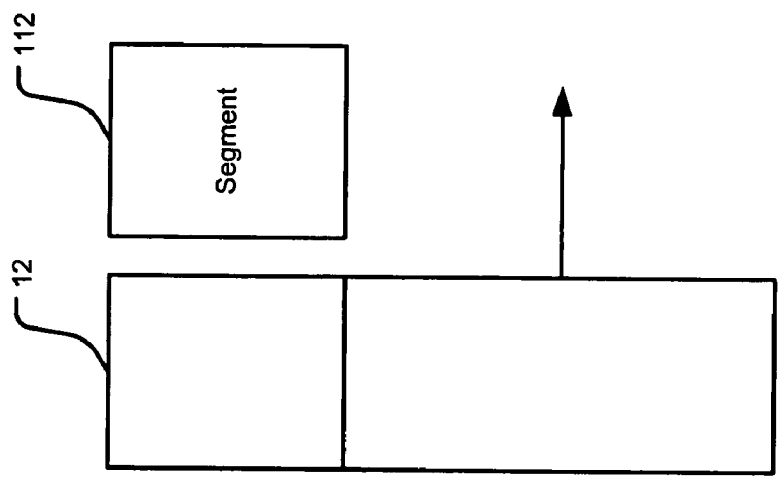
FIGS. 4A-4C show an exemplary method for generating checksums of packets according to the present invention.
Figure 4B:
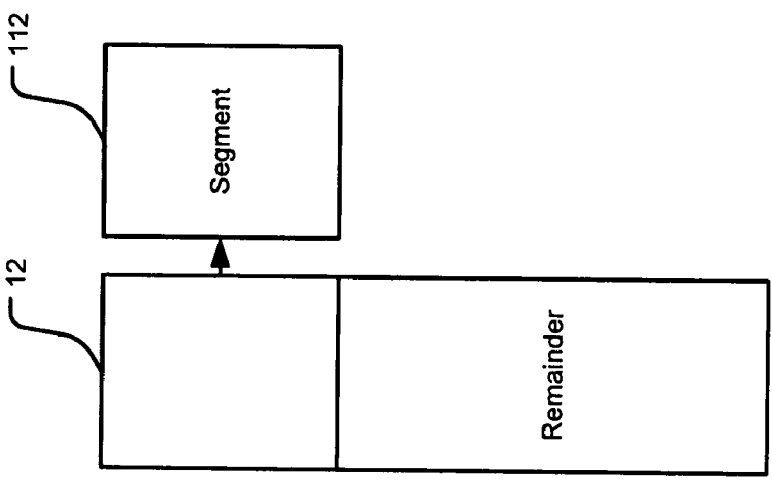
Figure 4A:
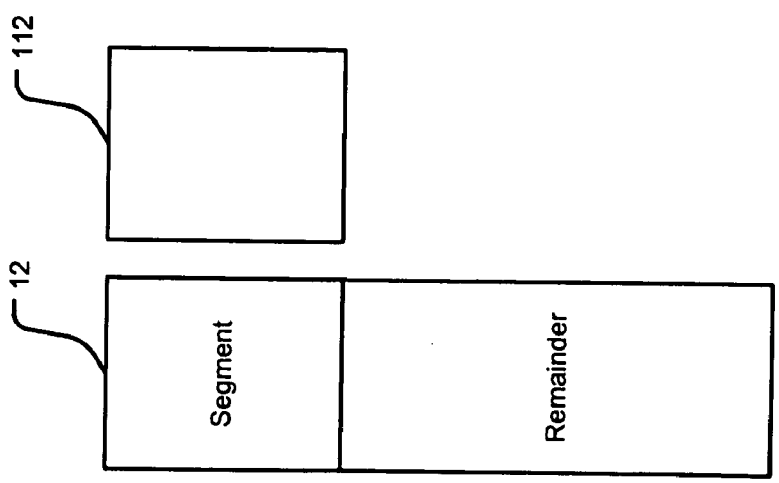

Referring now to FIGS. 4A-4C, the size of the packet 12 may be greater than the size of the adapter memory 112 as shown in FIG. 4A. In that case, the control module 110 reads a segment of the packet 12 from the host memory 154 for a first time and stores or latches the segment into the adapter memory 112 as shown in FIG. 4B. A size of the segment may be less than or equal to the memory size of the adapter memory 112.

The control module 110 calculates a partial checksum based on data in the segment while the segment is read from the host memory 154 and stored in the adapter memory 112. If the segment comprises a checksum field for the packet 12, the control module 110 writes the partial checksum in the checksum field in the segment while the segment is latched into the adapter memory 112. Otherwise, the control module stores the partial checksum in a register in the control module 110.

Subsequently, while the segment of the packet 12 is stored in the adapter memory 112, the control module 110 reads a remainder of the packet 12 from the host memory 154 as shown in FIG. 4C. Unlike the segment, however, the remainder of the packet 12 is not stored in the adapter memory 112. Consequently, a size of the remainder relative to the size of the adapter memory 112 and relative to the size of the segment is immaterial. The control module 110 reads the remainder as a stream of data. The control module 110 updates the partial checksum while the remainder is read. The updated partial checksum represents a final checksum of the packet 12.

Figure 5B:
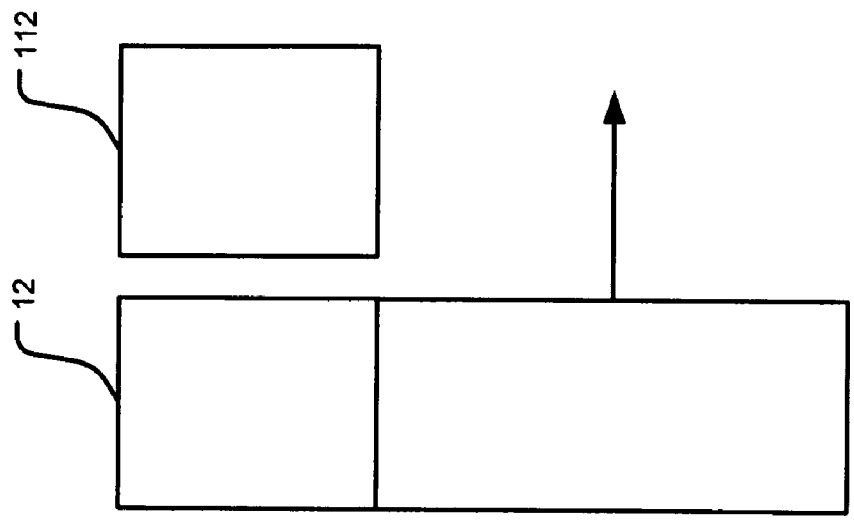
FIGS. 5A-5B show an exemplary method for transmitting packets with checksums according to the present invention.
Figure 5A:
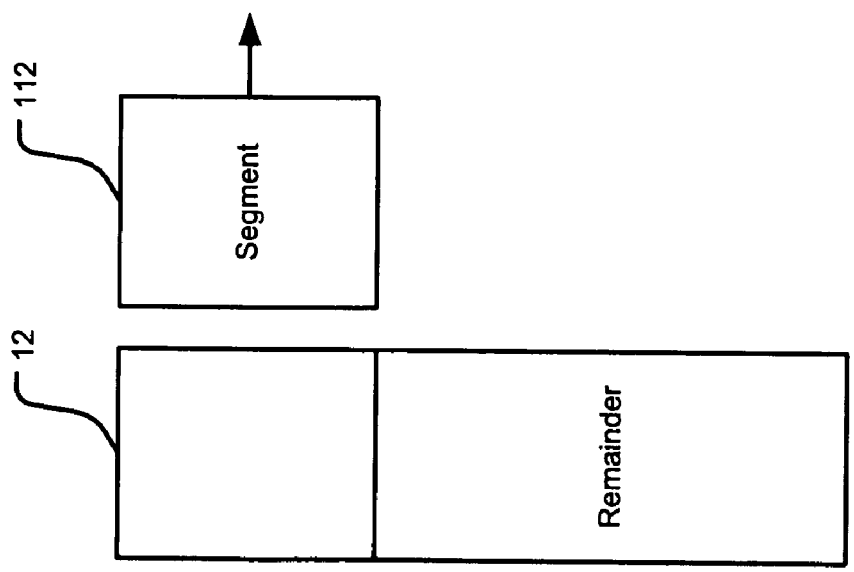

Referring now to FIGS. 5A-5B, the network adapter 102 transmits the packet 12 as follows. The physical layer module 108 transmits the segment of the packet 12 from the adapter memory 112 as shown in FIG. 5A. The segment is transmitted with the final checksum of the packet 12 if the segment comprises the checksum field of the packet 12. Otherwise, the segment is transmitted without the final checksum. To transmit the segment, the control module 110 does not read the segment from the host memory 154 for a second time.

Subsequently, to transmit the remainder of the packet 12, the control module 110 reads only the remainder from the host memory 154 for the second time. The control module 110 writes the final checksum from the register into the remainder if the remainder comprises the checksum field of the packet 12. The control module 110 writes the checksum in the remainder while the control module 110 reads the remainder from the host memory 154. The physical layer module 108 transmits the remainder of the packet 12 while the control module 110 reads the remainder of the packet 12.

A reduction in loading on the bus 18 is a function of the size of the adapter memory 112 and the size of the packet 12. For example, the size of the adapter memory 112 may be 2 KB, and the size of the packet 12 may be 8 KB. In that case, the size of the segment may be 2 KB and the size of the remainder may be 6 KB. The control module 110 latches the segment in the adapter memory 112 when the segment is read for the first time. Thereafter the control module 110 calculates the checksum of the packet 12 by reading the remainder. The remainder is not stored in the adapter memory 112.

The network adapter 102 transmits the segment directly from the adapter memory 112 instead of reading the segment again from the host memory 154, that is, without loading the bus 18. Instead, the network adapter 102 uses the bus 18 to read only the remainder or the remaining 6 KB of the packet 12 for the second time from the host memory 154. Thus, by not reading the segment (i.e., 2 KB of the 8 KB of data in the packet 12) for the second time, the system 100 yields a bandwidth economy of 50%.

As can be appreciated, the packet 12 may be read from the host memory 154 into the adapter memory 112 in forward or reverse direction. That is, the segment may comprise either a beginning or an end-portion of the packet 12. Alternatively, the packet 12 may be read in one direction during the first read and in another direction during the second read.

Figure 6:
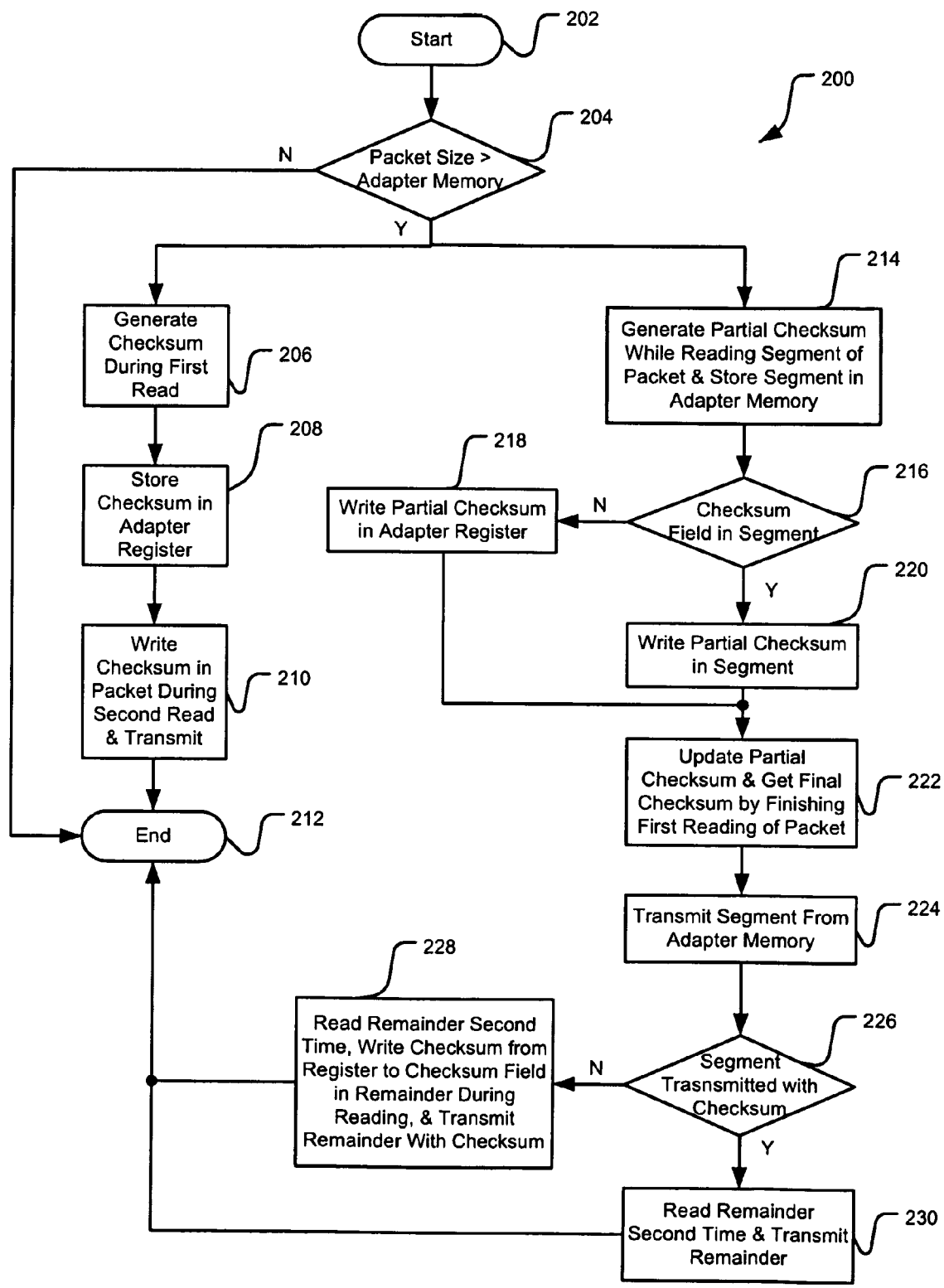
FIG. 6 is a flow chart of an exemplary method for generating checksum of packets according to the present invention.

Referring now to FIG. 6, a method 200 for computing checksums for packets begins in step 202. The control module 110 determines in step 204 whether the size of the packet 12 is greater than the size of the adapter memory 112. If false, the method 200 ends in step 212. Otherwise, the control module 110 reads the packet 12 for a first time from the host memory 154 and generates a checksum for the packet 12 in step 206. The control module 110 stores the checksum in a register in step 208. The control module 110 reads the packet 12 for a second time from the host memory 154, writes the checksum in a checksum field in the packet 12 while reading the packet 12, and the physical layer module 108 transmits the packet with the checksum in step 210. The method 200 ends in step 212.

Alternatively, if the result of step 204 is true, the control module 110 generates a partial checksum for the packet 12 while reading a segment of the packet 12 from the host memory 154 and stores the segment in the adapter memory 112 in step 214. The control module 110 determines in step 216 whether the segment of the packet 12 comprises the checksum field for the packet 12. If true, the control module 110 writes the partial checksum in the segment in step 220. Otherwise, the control module 110 writes the partial checksum in a register in step 218.

The control module 110 updates the partial checksum while reading the remainder of the packet 12 and generates a final checksum for the packet 12 by reading a remainder of the packet 12 for the first time from the host memory 154 in step 222. Thereafter, the control module 110 transmits the segment of the packet 12 from the adapter memory in step 224.

The control module 110 determines if the segment is transmitted with the checksum for the packet 12 in step 226. If true, the control module reads the remainder of the packet 12 for a second time from the host memory 154, and the physical layer module 108 transmits the remainder of the packet 12 in step 230. The method ends in step 212. If false, the control module 110 reads the remainder of the packet 12 for the second time from the host memory 156, writes the checksum for the packet 12 from the register into the remainder while the remainder is read, and the physical layer module 108 transmits the remainder with the checksum for the packet 12 in step 228. The method ends in step 212.

Figure 7A:
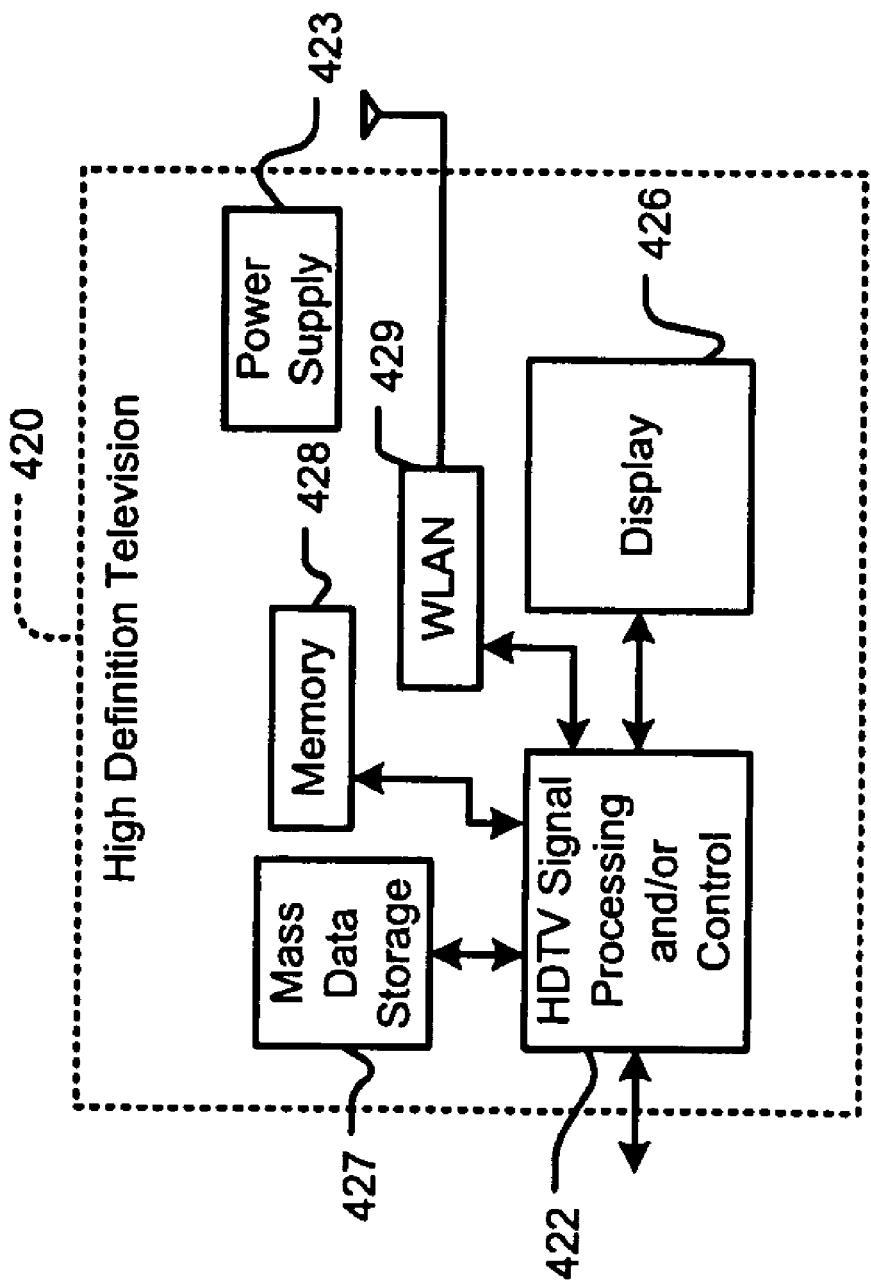
FIG. 7A is a functional block diagram of a high definition television.
Figure 7B:
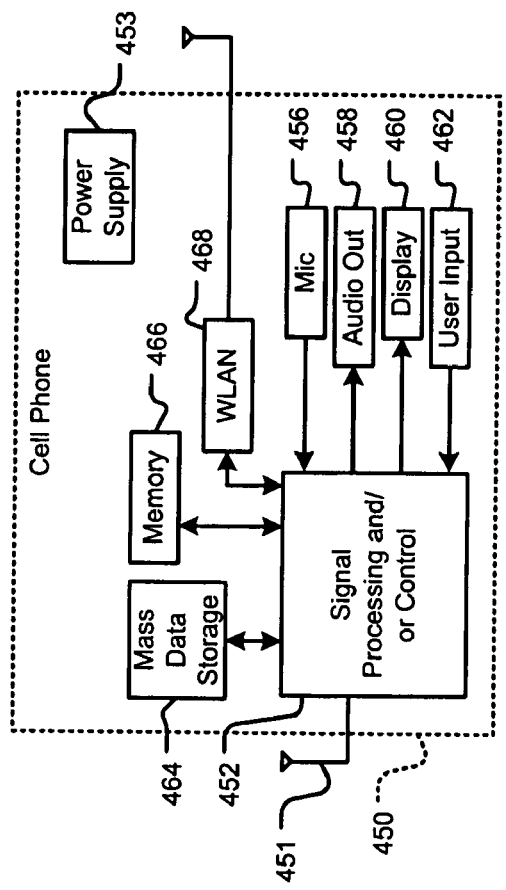
FIG. 7B is a functional block diagram of a cellular phone.
Figure 7C:
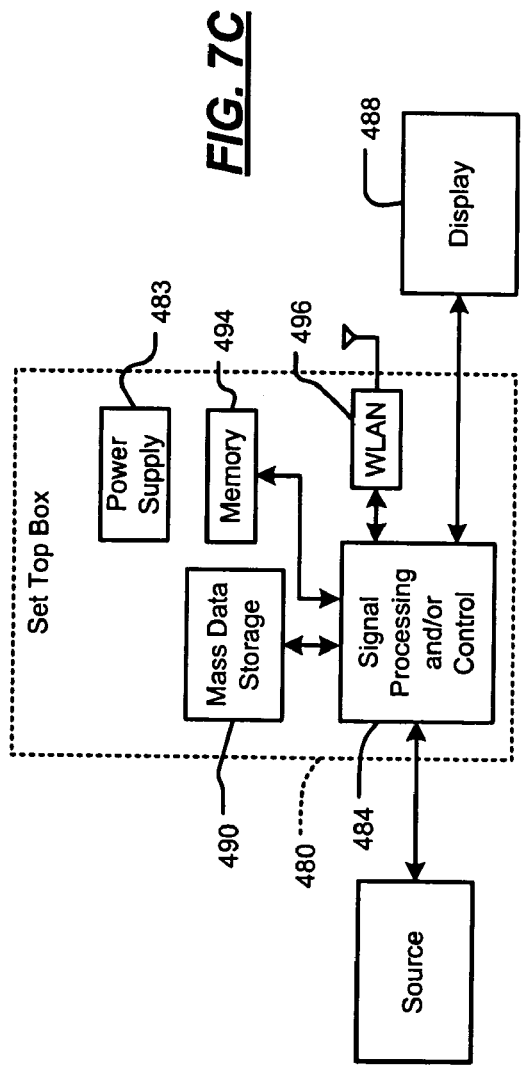
FIG. 7C is a functional block diagram of a set top box.

Referring now to FIGS. 7A-7C, various exemplary implementations of the present invention are shown. Referring now to FIG. 7A, the present invention can be implemented in a high definition television (HDTV) 420. The HDTV 420 receives HDTV input signals in either a wired or wireless format and generates HDTV output signals for a display 426. In some implementations, signal processing circuit and/or control circuit 422 and/or other circuits (not shown) of the HDTV 420 may process data, perform coding and/or encryption, perform calculations, format data and/or perform any other type of HDTV processing that may be required such as transmitting packets of data.

The HDTV 420 may communicate with mass data storage 427 that stores data in a nonvolatile manner such as optical and/or magnetic storage devices. The HDD may be a mini HDD that includes one or more platters having a diameter that is smaller than approximately 1.8". The HDTV 420 may be connected to memory 428 such as RAM, ROM, low latency nonvolatile memory such as flash memory and/or other suitable electronic data storage. The HDTV 420 also may support connections with a WLAN via a WLAN network interface 429.

Referring now to FIG. 7B, the present invention can be implemented in a cellular phone 450 that may include a cellular antenna 451. In some implementations, the cellular phone 450 includes a microphone 456, an audio output 458 such as a speaker and/or audio output jack, a display 460 and/or an input device 462 such as a keypad, pointing device, voice actuation and/or other input device. The signal processing and/or control circuits 452 and/or other circuits (not shown) in the cellular phone 450 may process data, perform coding and/or encryption, perform calculations, format data and/or perform other cellular phone functions such as transmitting packets of data.

The cellular phone 450 may communicate with mass data storage 464 that stores data in a nonvolatile manner such as optical and/or magnetic storage devices for example hard disk drives HDD and/or DVDs. The HDD may be a mini HDD that includes one or more platters having a diameter that is smaller than approximately 1.8". The cellular phone 450 may be connected to memory 466 such as RAM, ROM, low latency nonvolatile memory such as flash memory and/or other suitable electronic data storage. The cellular phone 450 also may support connections with a WLAN via a WLAN network interface 468.

Referring now to FIG. 7C, the present invention can be implemented in a set top box 480. The set top box 480 receives signals from a source such as a broadband source and outputs standard and/or high definition audio/video signals suitable for a display 488 such as a television and/or monitor and/or other video and/or audio output devices. The signal processing and/or control circuits 484 and/or other circuits (not shown) of the set top box 480 may process data, perform coding and/or encryption, perform calculations, format data and/or perform any other set top box function such as transmitting packets of data.

The set top box 480 may communicate with mass data storage 490 that stores data in a nonvolatile manner. The mass data storage 490 may include optical and/or magnetic storage devices for example hard disk drives HDD and/or DVDs. The HDD may be a mini HDD that includes one or more platters having a diameter that is smaller than approximately 1.8". The set top box 480 may be connected to memory 494 such as RAM, ROM, low latency nonvolatile memory such as flash memory and/or other suitable electronic data storage. The set top box 480 also may support connections with a WLAN via a WLAN network interface 496.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A network interface comprising:
   a control module of the network interface to:
      read a segment of a packet,
      store the segment in memory of the network interface when a size of the packet is greater than a size of the memory,
      generate a partial checksum for the packet based on the segment,
      read a remainder of the packet at a first time,
      update the partial checksum based on the remainder to generate a final checksum for the packet, and
      read the remainder at a second time, wherein the second time is subsequent to the first time; and
   a transmit module of the network interface to:
      transmit the segment from the memory, and
      transmit the remainder read at the second time.

2. An integrated circuit comprising the network interface of claim 1.

3. A network device comprising the network interface of claim 1.

4. The network interface of claim 1, wherein the control module writes the partial checksum in the segment if the segment includes a checksum field, and wherein the control module writes the partial checksum in a register of the network interface if the segment does not include the checksum field.

5. The network interface of claim 1, wherein the control module generates the final checksum by updating the partial checksum while the remainder is read at the first time.

6. The network interface of claim 1, wherein the control module writes the final checksum in the remainder read at the second time if the segment does not include a checksum field.

7. The network interface of claim 1, wherein the transmit module transmits the segment comprising the final checksum from the memory over one of Ethernet, optical, and wireless medium.

8. The network interface of claim 1, wherein the transmit module transmits the remainder read at the second time comprising the final checksum over one of Ethernet, optical, and wireless medium.

9. A method comprising:
   reading a segment of a packet,
   storing the segment in memory of a network interface when a size of the packet is greater than a size of the memory;
   generating a partial checksum for the packet based on the segment;
   reading a remainder of the packet at a first time;
   updating the partial checksum based on the remainder to generate a final checksum for the packet;
   reading the remainder at a second time, wherein the second time is subsequent to the first time;
   transmitting the segment from the memory; and
   transmitting the remainder read at the second time.

10. The method of claim 9 further comprising:
    writing the partial checksum in the segment if the segment includes a checksum field; and
    writing the partial checksum in a register of the network interface if the segment does not include the checksum field.

11. The method of claim 9 further comprising generating the final checksum by updating the partial checksum while the remainder is read at the first time.

12. The method of claim 9 further comprising writing the final checksum in the remainder read at the second time if the segment does not include a checksum field.

13. The method of claim 9 further comprising transmitting the segment comprising the final checksum from the memory over one of Ethernet, optical, and wireless medium.

14. The method of claim 9 further comprising transmitting the remainder read at the second time comprising the final checksum over one of Ethernet, optical, and wireless medium.

15. A network interface comprising:
a control module of the network interface to:
generate a partial checksum for a packet by reading a segment of the packet, and
generate a final checksum for the packet by reading a remainder of the packet at a first time; and
a transmit module of the network interface to:
transmit the segment, and
transmit the remainder when the remainder is read at a second time, wherein the second time is subsequent to the first time.

16. An integrated circuit comprising the network interface of claim 15.

17. A network device comprising the network interface of claim 15.

18. The network interface of claim 15, wherein the control module stores the segment in memory of the network interface when a size of the packet is greater than a size of the memory.

19. The network interface of claim 15, wherein the control module generates the final checksum without storing the remainder read at the first time in memory of the network interface.

20. The network interface of claim 15, wherein the control module writes the partial checksum in the segment if the segment includes a checksum field, and wherein the control module writes the partial checksum in a register of the network interface if the segment does not include the checksum field.

21. The network interface of claim 15, wherein the control module generates the final checksum by updating the partial checksum while the remainder is read at the first time.

22. The network interface of claim 15, wherein the control module writes the final checksum in the remainder read at the second time if the segment does not include a checksum field.

23. The network interface of claim 15, wherein the transmit module transmits the segment comprising the final checksum from the memory over one of Ethernet, optical, and wireless medium.

24. The network interface of claim 15, wherein the transmit module transmits the remainder read at the second time comprising the final checksum over one of Ethernet, optical, and wireless medium.

* * * * *